United States Patent [19]

Widmer

[11] Patent Number: 4,846,338
[45] Date of Patent: Jul. 11, 1989

[54] CURVED CONVEYOR ELEMENT
[75] Inventor: Hans Widmer, Mollis, Switzerland
[73] Assignee: Transver AG, Altendorf, Switzerland
[21] Appl. No.: 525,886
[22] Filed: Aug. 24, 1983
[30] Foreign Application Priority Data Sep. 3, 1982 [CH] Switzerland ........................ 5259/82

[51] Int. Cl.[4] ............................................. B65G 15/02
[52] U.S. Cl. .................................... 198/831; 198/813
[58] Field of Search ................................ 198/831, 813
[56] References Cited

U.S. PATENT DOCUMENTS

| 1,418,577 | 6/1922 | Johnston | 198/813 |
| 3,217,861 | 11/1965 | Daniluk et al. | 198/831 |
| 3,358,811 | 12/1967 | Gerrish | 198/831 |
| 3,456,776 | 7/1969 | Viene | 198/813 |
| 3,511,358 | 5/1970 | Peterson | 198/813 |
| 4,202,443 | 5/1980 | Bührer | 198/831 |

FOREIGN PATENT DOCUMENTS

| 1910605 | 9/1970 | Fed. Rep. of Germany . | |
| 2204378 | 2/1973 | Fed. Rep. of Germany | 198/813 |
| 7600514 | 7/1977 | Netherlands | 198/831 |
| 599890 | 6/1978 | Switzerland . | |

Primary Examiner—Robert J. Spar
Assistant Examiner—James R. Bidwell
Attorney, Agent, or Firm—Spencer & Frank

[57] ABSTRACT

A curved conveyor element is provided which comprises outer and inner spaced curved frame members having first and second ends. A pivotal head is rotatably mounted to the frame at one end, a row of rollers being provided in the pivotal head and a second row being secured to the other end of the frame. An endless conveyor belt passes around both rows of rollers, and is driven by a drive attached to the belt by elastic dog members. Removable supporting elements are positioned between the outer and inner frame members substantially coplanar with the conveyor belt. The pivotal head is rotatable to a position above the upper reach of the belt to permit the belt to be installed and removed through a slot defined by the removable supporting elements.

9 Claims, 5 Drawing Sheets

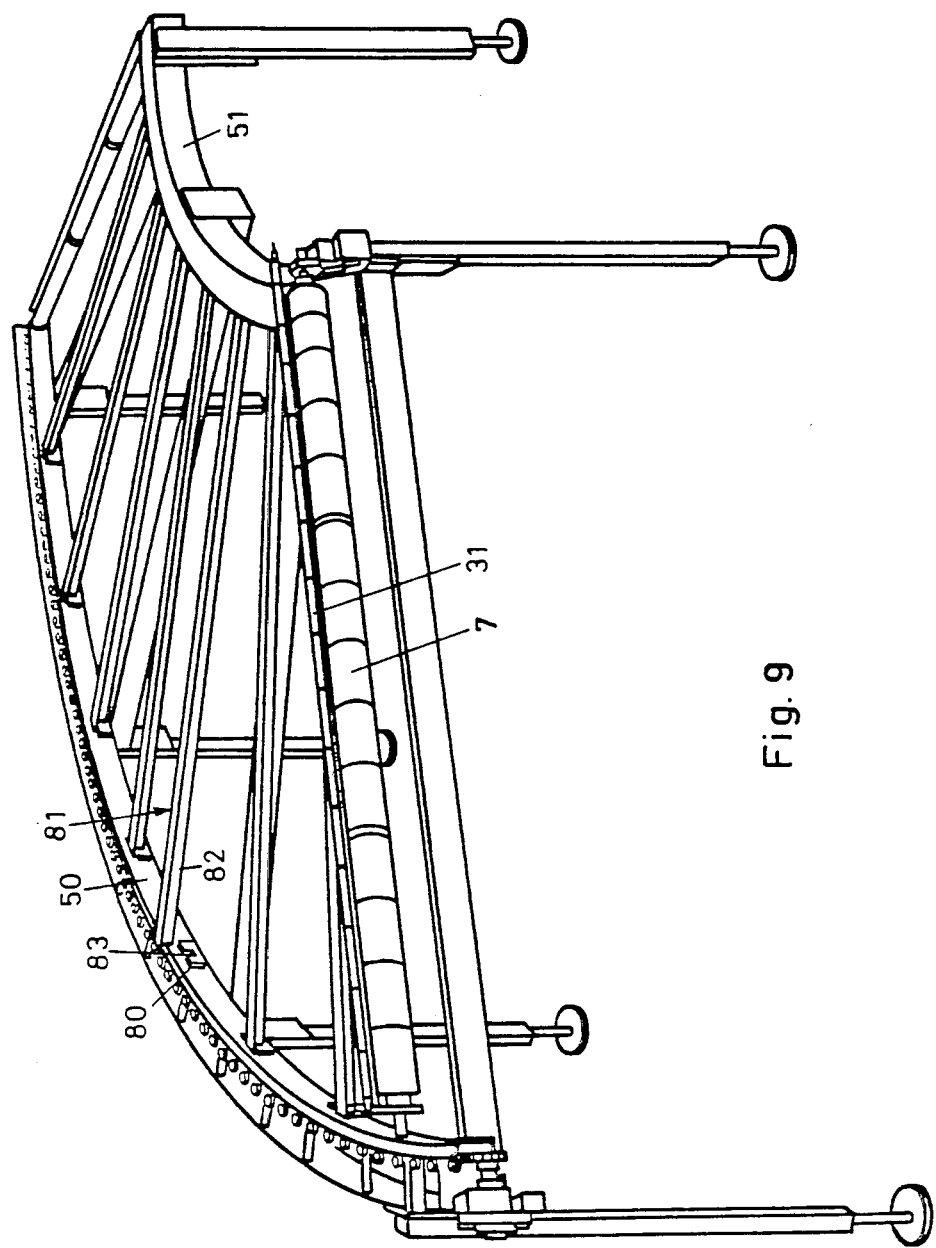

CURVED CONVEYOR ELEMENT

BACKGROUND OF THE INVENTION

The present invention relates to a curved conveyor element and, in particular, to a curved conveyor element having a belt which is easily removable.

In conveyor systems, goods are often transported over curves and other irregular sections of a conveyor path. This occurs because, for reasons of space, a processing line must be arranged in a meander pattern or because a difference in height must be overcome by moving the goods upward on a helical conveyor path.

According to Swiss Pat. No. 599,890, it is known to stretch a curved belt over two rows of rollers whose axes subtend an angle of 90°. A driven conveyor chain is disposed at the outer circumference of the belt and is guided by a rail arrangement which establishes the curvature of the belt. Along its entire outer circumference, the conveyor belt is fastened to the conveyor chain by means of spaced dog members, such as, for example, helical tension springs. The conveyor chain may be guided in the rail by means of a tenon block, or the conveyor chain itself may be accommodated in a groove-like guide rail and may comprise rollers.

Such conveyor belt systems are disadvantageous in that it is difficult to exchange soiled or damaged conveyor belts. Due to the conical nature of the entire system, the conveyor belt to be exchanged must either be cut apart or pulled toward the center of the curve. If the conveyor belt can be removed only by cutting, the substitute conveyor belt must be inserted in a folded-out manner, and must be connected at the final location to form an endless belt. Thus, the belt tension may vary within wide limits causing the lower reach of the belt to sag, and this may lead to malfunctions in helical conveyors if the free space is designed for unimpeded passage of the goods.

Uniform tension can be realized only if the belt is prefabricated within close tolerances. If this is the case, the belt must be removed toward the center of the curve and inserted from the same location. If the width of the belt and the radius of the conveyor are great, an exchange toward the center becomes complicated, particularly if the space within the curve is utilized for columns or other structural objects. Even without space-blocking objects, the exchange of conveyor belts is difficult if a guide with a second chain is provided in the interior of the curve or if the inner groove must be enlarged to accommodate the rows of rollers and to mount slide sheets or the like, and if the system involves an overhead arrangement.

It is therefore an object of the present invention to find a solution for the problem of installing and removing conveyor belts in curved conveyor sections.

SUMMARY OF THE INVENTION

In accordance with the present invention, a curved conveyor element is provided which comprises outer and inner spaced curved frame members having first and second ends. A pivotal head is rotatably mounted to the frame at one end, a row of rollers being provided in the pivotal head and a second row being secured to the other end of the frame. An endless conveyor belt passes around both rows of rollers, and is driven by a drive attached to the belt by means of elastic dog members. Removable means are positioned between the outer and inner frame members substantially coplanar with the conveyor belt. The pivotal head is rotatable to a position above the upper reach of the belt to permit the belt to be installed and removed through a slot defined by the removable means.

BRIEF DESCRIPTION OF THE DRAWINGS

FIG. 9 is a perspective view of the frame of a curved conveyor element including a third type of support for the conveyor belt.

DESCRIPTION OF THE PREFERRED EMBODIMENTS

Figure 1:
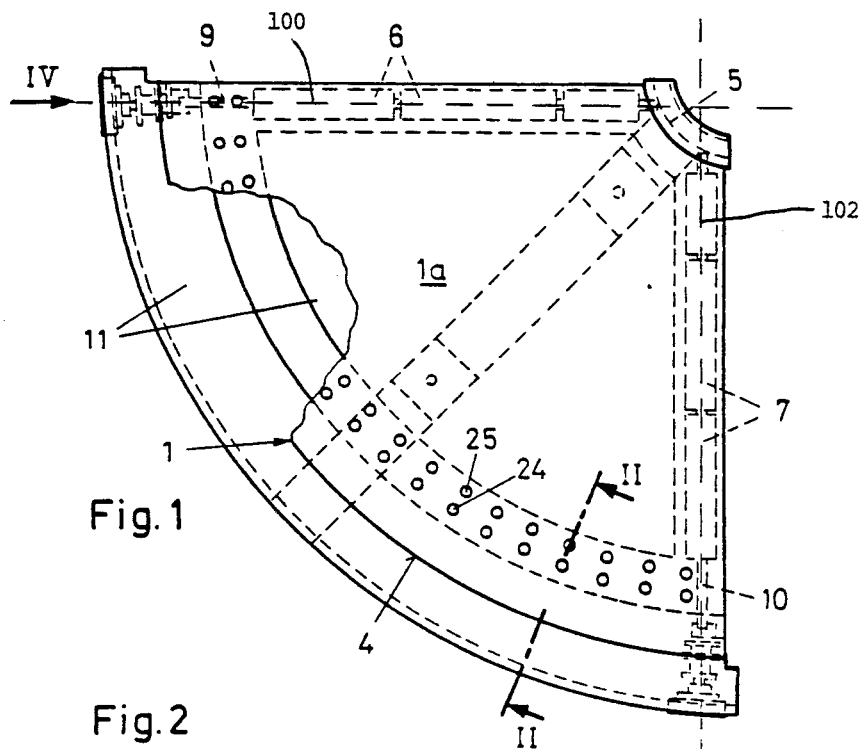
FIG. 1 is a top view of a 90° curved conveyor element with the conveyor belt partially broken away.
Figure 2:
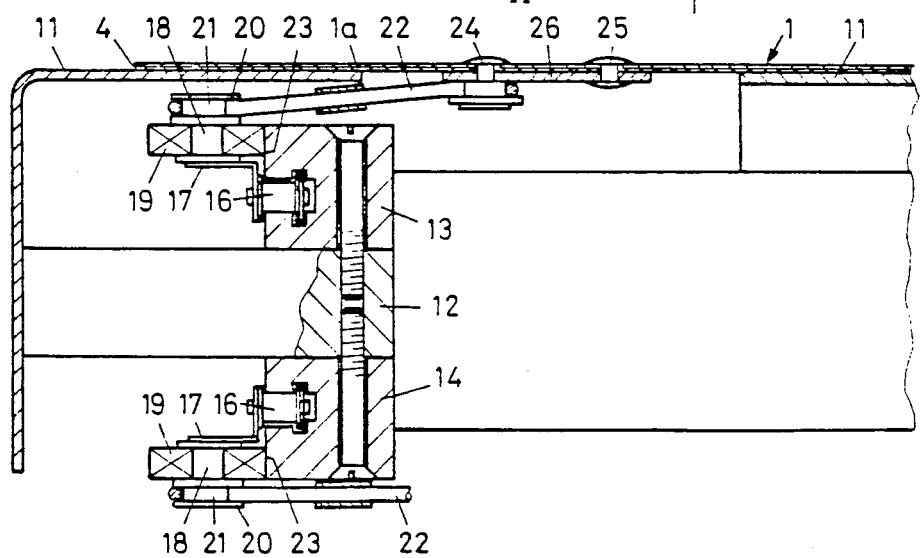
FIG. 2 is a sectional view along section line II—II of FIG. 1 to an enlarged scale.
Figure 3:
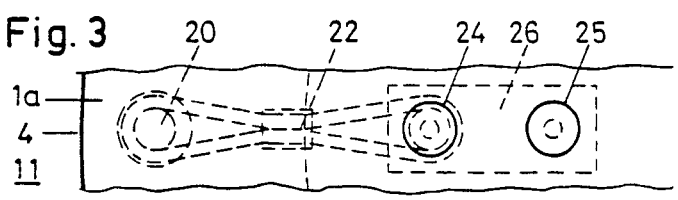
FIG. 3 is a top view of part of a conveyor belt including an elastic dog member.

A curved conveyor section having first and second ends which are perpendicular with respect to each other is shown in FIGS. 1 through 3. The conveyor includes an endless conveyor belt 1 of known type having an upper reach 1a with curved side edges 4 and 5, the conveyor belt having a semicircular shape. The conveyor belt 1 passes around two rows of cylindrical rollers 6 and 7 mounted for rotation on shafts 9 and 10 respectively. Shafts 9 and 10 have respective intersecting axes 100 and 102 which subtend an angle of 90° and define the ends of the conveyor section.

The side edge 4 on the outer curvature of the conveyor belt 1 rests on a planar contact surface 11 which is part of a ring member 12. Ring member 12 is provided with two guide rails 13 and 14 equipped with recesses for the two reaches of an endless conveyor chain 16 which drives conveyor belt 1, the conveyor chain being driven by a motor (not shown). Conveyor chain 16 is equipped with equidistantly spaced angular supporting bars 17 each having a journal 18 for a roller 19 rigidly fastened thereto. Each of the journals 18 has a head 20 provided with a circumferential groove 21 which serves as a mount for an elastic dog member 22. Preferably, dog members 22 are elastomer rings.

Rollers 19, during their rotation on pin 18, are supported on their jacket surfaces by a guide face 23 of guide rails 13 and 14. In this embodiment of the invention, dog members 22 are fastened to conveyor belt 1 by rivets 24 and 25 and a tongue 26, conveyor belt 1 being pulled by dog members 22. The dog members are disposed below the upper reach 1a of conveyor belt 1 so that goods being transported may project beyond the outer curvature of the conveyor belt when travelling through the curves.

One of the two rows of rollers 6 and 7 can be pivoted out of the area of the upper reach 1a of conveyor belt 1 to permit the rows of rollers to be easily removed and the conveyor belt readily pulled off. Additionally, slide sheets or supports are mounted between the inner edge 5 and the outer edge 4 so as to form a slit therebetween, the untensioned conveyor belt being easily removed toward the top of the apparatus through this slit.

Figure 4:
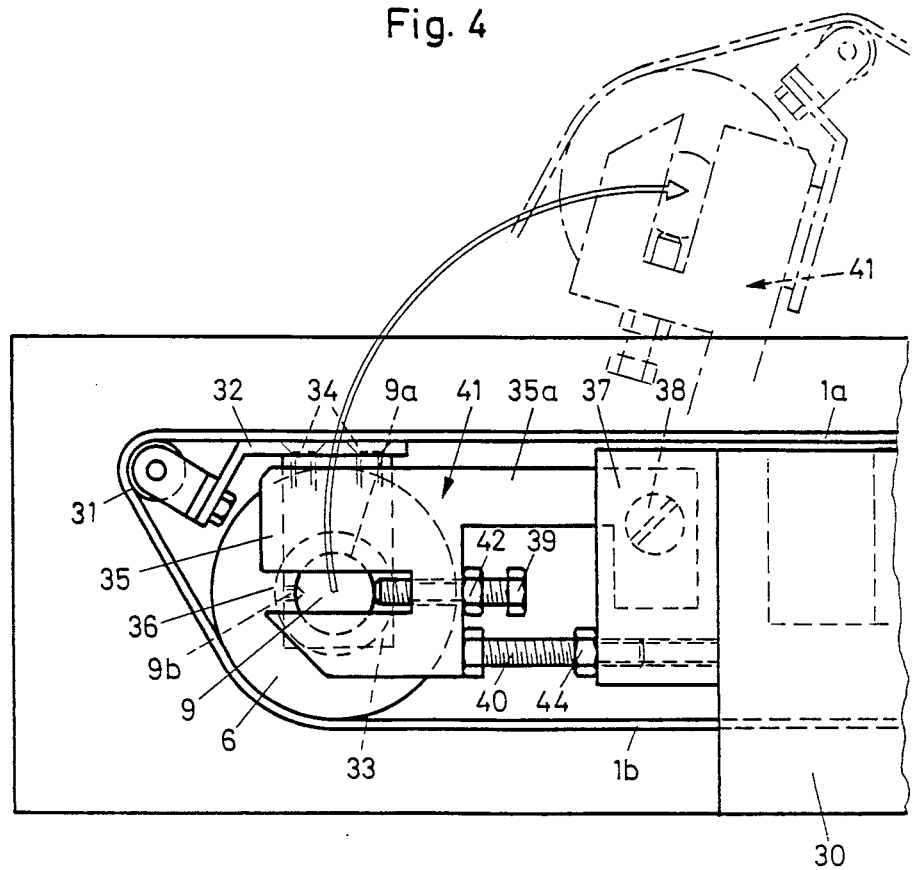
FIG. 4 is a side view of a deflection head seen in the direction of arrow IV of FIG. 1.

According to a first embodiment shown in FIG. 4, the row of rollers 6 has its shaft 9 held in a pivotal head 41. Head 41 includes roll carriers 33 each having a bore 9a in which shaft 9 rotates. A threaded radial bore 9b extends in a direction perpendicular to bore 9a to accommodate set screws which fasten shaft 9 to the roll carriers 33. The pivotal head 41 is part of a deflection head which includes rollers 6, shaft 9, a spacer 32 and a row of cylindrical end rollers 31 attached to spacer 32. The spacer 32 is fastened to roll carriers 33 by screws 34. Pivotal head 41 further includes head plates 35 which have slots 36 for receiving shaft 9, roll carriers 33 and spacer 32. Head plates 35 are mounted for rotation about the axis of a rotary bearing 38 in a tongue 37 which is part of a frame 30. In this way, the row of end rollers 31 and the rollers 6 can be pivoted upwardly beyond the upper reach 1a. This removes tension from the conveyor belt 1 and makes it possible to remove through the slots 36 in head plates 35 the roll carriers 33, row of rollers 6, spacer 32 and row of end rollers 31.

To reproduceably set the belt tension, there is provided an adjustable abutment with a bolt screw 40 and counternut 44. The end position of the row of end rollers 31 is set by means of a set screw 39 having a counternut 42.

The dashed lines show the pivotal head 41 pivoted outwardly with respect to the frame 30 of the conveyor system. In the operating position of pivotal head 41, which is shown in solid lines, the distance between the axis of rotation of rotary bearing 38 and the upper reach 1a, of the conveyor belt 1 is less than the distance between the axis 100 of shaft 9 and the upper conveyor belt reach 1a. Accordingly, the resultant of the forces acting in the horizontal direction is located at a point between the bolt screw 40 and lever arm 35a of head plate 35. This produces a net counterclockwise moment about the axis of bearing 38 causing the pivotal head 41 to be biased toward the operating position.

Figure 5:
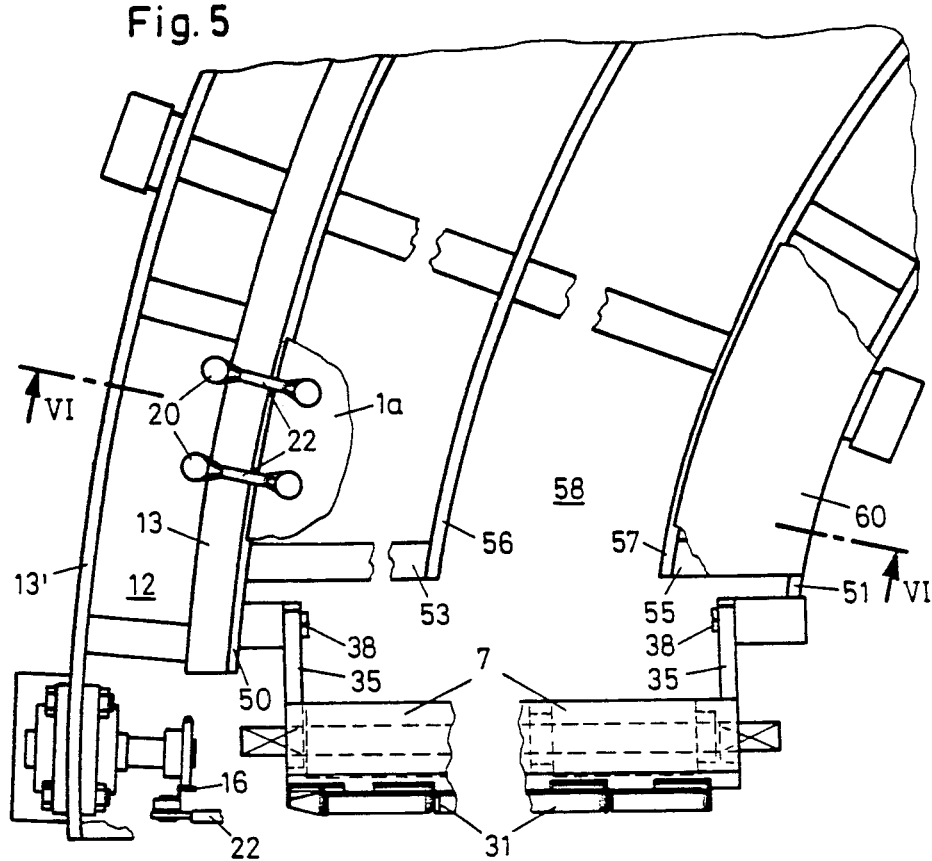
FIG. 5 is a top view of a curved element including a first type of support for the conveyor belt.
Figure 6:
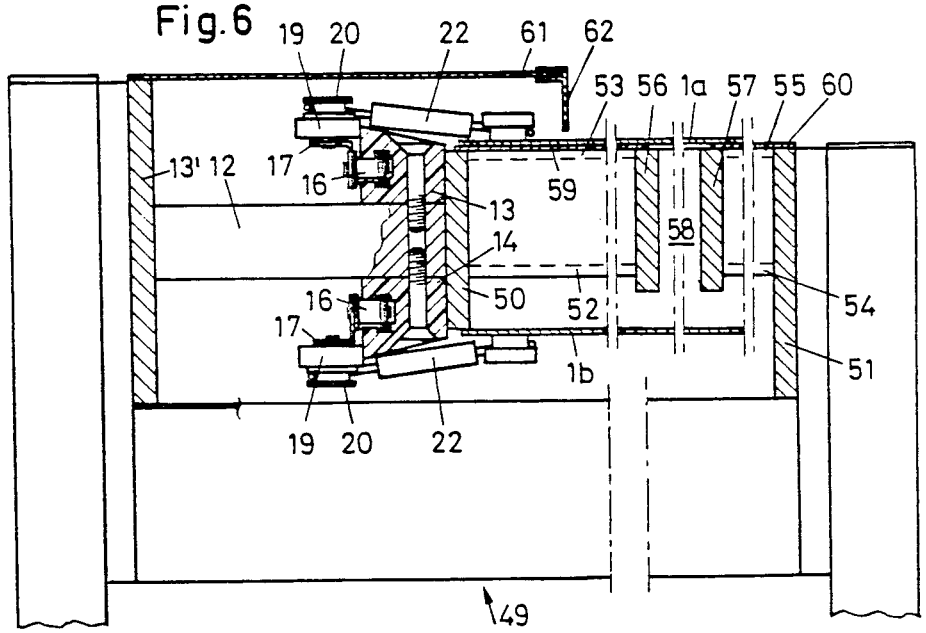
FIG. 6 is a sectional view along section line VI—VI of FIG. 5.

FIG. 5 is a top view of a curved conveyor element which is similar to FIG. 1, and FIG. 6 is a sectional view similar to FIG. 2. This embodiment differs in that dog members 22 are positioned outside conveyor belt 1, and the guide and drive section of the conveyor belt is protected by a cover having a horizontally disposed member 61 attached to a support 13' and a vertically disposed member 62, the cover members 61 and 62 being fixed to a frame 49. The parts already discussed in connection with FIGS. 1 and 2 have been given the same reference numerals in FIGS. 5 and 6, and therefore, their description will not be repeated.

In addition to the two guide rails 13 and 14, an outer frame member 50 of the supporting structure is fastened to the annular member 12 which itself is fastened via support 13' to frame 49. An inner frame member 51 is fastened to the frame 49 at the inside of the curve. The inner frame member 51 and the outer frame member 50 are provided with struts 52-55 for supporting rings 56 and 57. A slot is formed between the supporting rings 56 and 57 which extends over the entire length of the curved conveyor element. A slip sheet 59 is supported on the outer frame member 50 and on the outer supporting ring 56, and a slip sheet 60 is supported on the inner supporting ring 57 and on the inner frame member 51 so that slot 58 extends continuously below the upper reach 1a of the conveyor belt.

Segment-like slip sheets could also be placed over the entire width of the belt and, after the tension on the deflection head has been released and covers 61 and 62 removed, these segmental sheets could be removed in the direction toward the periphery of the curve. Such an arrangement is particularly suitable for transporting medium heavy goods.

Figure 7:
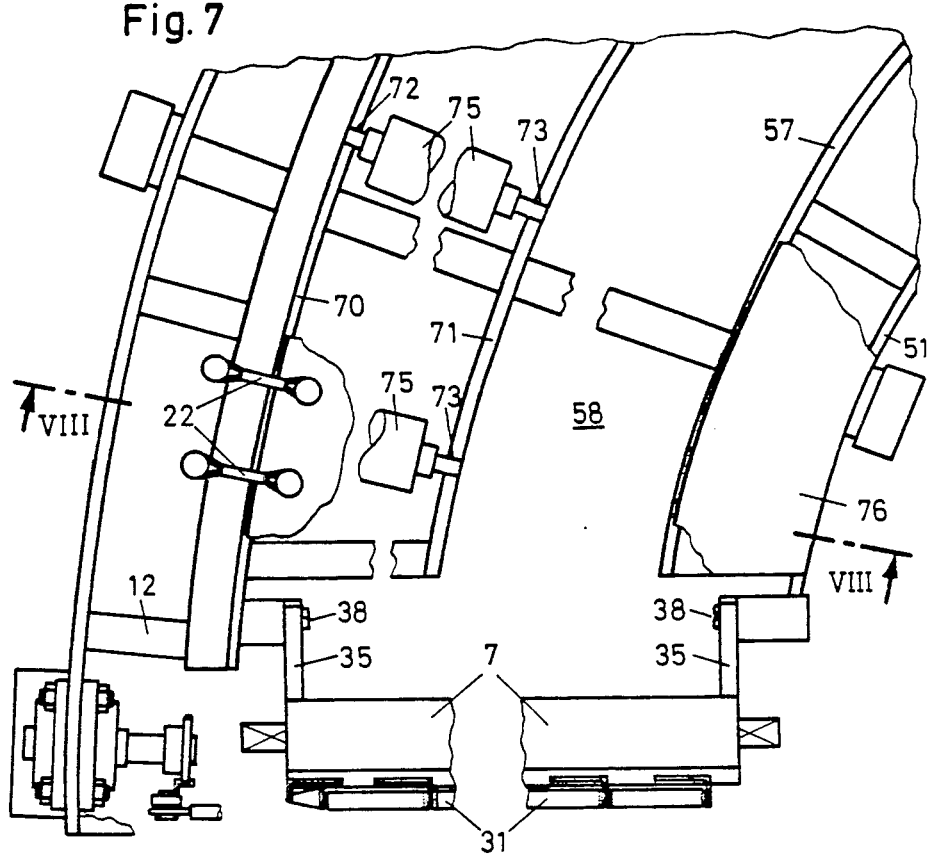
FIG. 7 is a top view of a curved element including a second type of support for the conveyor belt.
Figure 8:
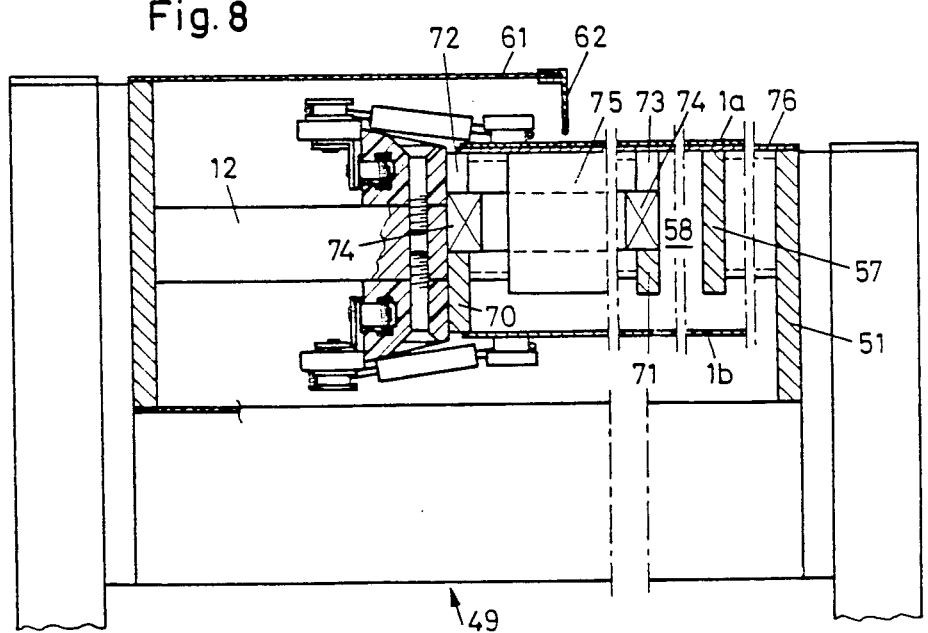
FIG. 8 is a sectional view along section line VIII—VIII of FIG. 7.

The arrangement shown in FIGS. 7 and 8 can be used for the transportation of heavy goods. In this embodiment, supporting rollers 75 are distributed over the length of the curved conveyor member between the outer frame member 70 and the outer supporting ring 71, the ends 74 of the supporting rollers 75 being inserted in grooves 72 and 73 in outer frame member 70 and outer supporting ring 71. Therefore, the supporting rollers can be lifted out of their mounts once conveyor belt 1 has been removed, and can be cleaned or replaced. Additionally, trapezoidal slip sheets 76 are disposed between inner frame member 51 and outer frame member 70 to support the upper reach 1a of the conveyor belt in the region of the slot 58. These slip sheets are not fixed to the frame and can therefore be lifted off and removed as easily as supporting rollers 75.

FIG. 9 shows an arrangement of frame 49 and the support for a conveyor belt for operation under wet conditions. In this illustration, the conveyor belt has been removed to show that the outer frame member 50 and the inner frame member 51 each have equidistantly spaced holders 80. T-profile carriers 81 serve as supporting elements whose bars 82 are inserted into recesses 83 in holders 80, so that the outer faces of the arms of the T-profile carriers 81 together define a surface for the conveyor belt. As can be seen in this illustration, the T-profile carriers 81 can be lifted out once tension on the conveyor belt has been released so that the entire space between the outer and inner frame member is free of impeding elements. Thus, the conveyor belt can be lifted out directly without requiring complicated disassembly of parts of the conveyor system.

To insert the conveyor belt, T-profile carriers 81 are inserted into holders 80 between the upper and lower reaches 1a and 1b. Thereafter, roll carriers 33 with the rows of rollers 6 or 7 are inserted into head plates 35 and pivoted downwardly. After connecting dog members 22, the curved conveyor element is ready for operation.

It will be understood that the above description of the present invention is susceptible to various modifications, changes and adaptations, and the same are intended to be comprehended within the meaning and range of equivalents of the appended claims.

What is claimed is:

1. A curved conveyor element comprising outer and inner spaced curved frame members having first and second ends, said outer member being longer than said inner member, an axis perpendicular to said outer and inner frame members at said first end intersecting an axis perpendicular to said outer and inner frame members at said second end to subtend a predetermined angle therebetween;

a pivotal head rotatably mounted on said frame members at the first end thereof;

first and second rows of rollers rotatably mounted on first and second shafts respectively, said first shaft being removably attached to said pivotal head and said second shaft being removably secured to said frame members at the second end thereof;

an endless conveyor belt having upper and lower essentially horizontal reaches passed around said first and second rows of rollers;

a conveyor drive including a chain and guide rails;

elastic dog members attached to said conveyor belt and said conveyor drive, said belt being driven by said conveyor drive via said elastic dog members; and a transverse frame member interconnecting said outer and inner frame members below the lower reach of said conveyor belt, said outer and inner frame members defining a slot therebetween spanning the length of said conveyor element and enabling, after removal of said first and second shafts and rows of rollers, removal of said conveyor belt therethrough.

2. A curved conveyor element as defined in claim 1, wherein said pivotal head is rotatably mounted in a rotary bearing secured to said frame members.

3. A curved conveyor element as defined in claim 2, wherein a horizontal resultant force is generated by said conveyor belt passing around said first row of rollers attached to said pivotal head, and wherein the axis of said rotary bearing is disposed between the plane containing said horizontal resultant force and the upper reach of said conveyor belt.

4. A curved conveyor element as defined in claim 3, wherein setting means are attached to said pivotal head for adjusting the tension of said conveyor belt.

5. A curved conveyor element comprising outer and inner spaced curved frame members having first and second ends, said outer member being longer than said inner member, an axis perpendicular to said outer and inner frame members at said first end intersecting an axis perpendicular to said outer and inner frame members at said second end to subtend a predetermined angle therebetween;

a pivotal head rotatably mounted on said frame members at the first end thereof;

first and second rows of rollers rotatably mounted on first and second shafts respectively, said first shaft being removably attached to said pivotal head and said second shaft being removably secured to said frame members at the second end thereof;

an endless conveyor belt having upper and lower essentially horizontal reaches passed around said first and second rows of rollers;

a conveyor drive including a chain and guide rails;

elastic dog members attached to said conveyor belt and said conveyor drive, said belt being driven by said conveyor drive via said elastic dog members;

transverse supporting elements interconnecting said outer and inner frame members below the lower reach of said conveyor belt, said outer and inner frame members defining a slot therebetween spanning the length of said conveyor element and enabling, after removal of said first and second shafts and rows of rollers, removal of said conveyor belt therethrough; and a plurality of spaced vertically slotted supports attached to opposing surfaces of said outer and inner frame members, said supporting elements being T-shaped and the vertical portion of said T-shaped elements being removably inserted in the vertical slots of said supports.

6. A curved conveyor element comprising outer and inner spaced curved frame members having first and second ends, said outer member being longer than said inner member, an axis perpendicular to said outer and inner frame members at said first end intersecting an axis perpendicular to said outer and inner frame members at said second end to subtend a predetermined angle therebetween;

a pivotal head rotatably mounted on said frame members at the first end thereof;

first and second rows of rollers rotatably mounted on first and second shafts respectively, said first shaft being removably attached to said pivotal head and said second shaft being removably secured to said frame members at the second end thereof;

an endless conveyor belt having upper and lower essentially horizontal reaches passed around said first and second rows of rollers;

a conveyor drive including a chain and guide rails;

elastic dog members attached to said conveyor belt and said conveyor drive, said belt being driven by said conveyor drive via said elastic dog members;

a transverse frame member interconnecting said outer and inner frame members below the lower reach of said conveyor belt, said outer and inner frame members defining a slot therebetween spanning the length of said conveyor element and enabling, after removal of said first and second shafts and rows of rollers, removal of said conveyor belt therethrough;

first and second spaced curved support members positioned between and spaced from said outer and inner frame members and extending in the same direction, said first support member being adjacent said outer frame member and said second support member being adjacent said inner frame member; and at least first and second slip sheets, said first slip sheets being supported by said outer frame member and said first support member and said second slip sheet being supported by said inner frame member and said second support member, said slot being between said first and second support members and defined by the opposing edges of said first and second slip sheets.

7. A curved conveyor element as defined in claim 6 which further comprises a plurality of rollers rotatably mounted between said outer frame member and said outer support member, said rollers supporting the upper reach of said conveyor belt.

8. A curved conveyor element as defined in claim 7 wherein said plurality of rollers is positioned approximately perpendicular to said guide rails.

9. A curved conveyor element comprising outer and inner spaced curved frame members having first and second ends, said outer member being longer than said inner member, an axis perpendicular to said outer and inner frame members at said first end intersecting an axis perpendicular to said outer and inner frame members at said second end to subtend a predetermined angle therebetween;

a pivotal head rotatably mounted on said frame members at the first end thereof;

first and second rows of rollers rotatably mounted on first and second shafts respectively, said first shaft being removably attached to said pivotal head and said second shaft being removably secured to said frame members at the second end thereof;

an endless conveyor belt having upper and lower essentially horizontal reaches passed around said first and second rows of rollers;

a conveyor drive including a chain and guide rails;

elastic dog members attached to said conveyor belt and said conveyor drive, said belt being driven by said conveyor drive via said elastic dog members;

a transverse frame member interconnecting said outer and inner frame members below the lower reach of said conveyor belt, said outer and inner frame members defining a slot therebetween spanning the length of said conveyor element and enabling, after removal of said first and second shafts and rows of rollers, removal of said conveyor belt therethrough;

first and second spaced curved support members positioned between and spaced from said outer and inner frame members and extending in the same direction, said first support member being adjacent said outer frame member and said second support member being adjacent said inner frame member;

a plurality of rollers rotatably mounted between said outer frame member and said outer support member, said rollers being positioned approximately perpendicular to said guide rails; and a plurality of removable slip sheets supported by said outer and inner frame members, said slip sheets covering the spaces between said rollers and between said rollers and said second support member.

* * * * *